(12) United States Patent
Tanizawa et al.

(10) Patent No.: US 10,348,492 B2
(45) Date of Patent: Jul. 9, 2019

(54) QUANTUM KEY DISTRIBUTION DEVICE, QUANTUM KEY DISTRIBUTION SYSTEM, AND QUANTUM KEY DISTRIBUTION METHOD

(71) Applicant: Kabushiki Kaisha Toshiba, Minato-ku (JP)

(72) Inventors: Yoshimichi Tanizawa, Yokohama (JP); Hideaki Sato, Yokohama (JP); Kazuaki Doi, Kawasaki (JP); Ririka Takahashi, Setagaya (JP); Akira Murakami, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 58 days.

(21) Appl. No.: 14/870,362

(22) Filed: Sep. 30, 2015

(65) Prior Publication Data
US 2016/0142203 A1    May 19, 2016

(30) Foreign Application Priority Data
Nov. 19, 2014 (JP) ................................. 2014-234947

(51) Int. Cl.
*H04L 9/08* (2006.01)
(52) U.S. Cl.
CPC .......... *H04L 9/0852* (2013.01); *H04L 9/0816* (2013.01); *H04L 9/0858* (2013.01)
(58) Field of Classification Search
CPC .... H04L 9/0858; H04L 9/0852; H04L 9/0816
See application file for complete search history.

(56) References Cited

U.S. PATENT DOCUMENTS

2004/0233935 A1* 11/2004 Yuan ...................... B82Y 10/00
  370/474
2005/0259825 A1* 11/2005 Trifonov ............... H04L 9/0858
  380/277

(Continued)

FOREIGN PATENT DOCUMENTS

JP     2011-166292     8/2011
JP     2014-022898     2/2014

OTHER PUBLICATIONS

Akihiro Tanaka, et al., "Development of a key distillation hardware engine for high speed quantum-key distribution", IEICE Technical Report, vol. 110, No. 392, Jan. 2011, 19 pages (with English Abstracts and English language translation).

*Primary Examiner* — Tae K Kim
(74) *Attorney, Agent, or Firm* — Oblon, McClelland, Maier & Neustadt, L.L.P.

(57) ABSTRACT

According to an embodiment, a quantum key distribution device includes first and second operation units. The first operation unit is configured to perform a first operation as a key distillation operation. The first operation unit includes a hardware circuit for performing a part of the first operation. The key distillation operation includes a sifting operation for a photon bit string generated through quantum key distribution with another quantum key distribution device via a quantum communication channel. The second operation unit is configured to perform a second operation as a key distillation operation other than the first operation. The second operation unit includes a circuit for a part of the second operation. The first operation unit stores intermediate data generated by the first operation. The second operation unit generates, by the second operation, a cryptographic key being the same as for the another quantum key distribution device from the intermediate data.

8 Claims, 7 Drawing Sheets

(56) References Cited

U.S. PATENT DOCUMENTS

| | | | |
|---|---|---|---|
| 2006/0059343 A1* | 3/2006 | Berzanskis | H04L 7/0008 713/171 |
| 2006/0093143 A1* | 5/2006 | Maeda | H04L 9/0852 380/256 |
| 2010/0241912 A1* | 9/2010 | Kwok | H04L 9/0858 714/704 |
| 2011/0064222 A1* | 3/2011 | Wiseman | H04L 9/0827 380/255 |
| 2011/0075839 A1* | 3/2011 | Noh | H04L 9/0858 380/44 |
| 2014/0023192 A1 | 1/2014 | Tanizawa et al. | |
| 2014/0187427 A1* | 7/2014 | Macready | G06N 99/002 505/170 |
| 2015/0312035 A1* | 10/2015 | Choi | H04L 9/0858 380/278 |

* cited by examiner

QUANTUM KEY DISTRIBUTION DEVICE, QUANTUM KEY DISTRIBUTION SYSTEM, AND QUANTUM KEY DISTRIBUTION METHOD

CROSS-REFERENCE TO RELATED APPLICATION

This application is based upon and claims the benefit of priority from Japanese Patent Application No. 2014-234947, filed on Nov. 19, 2014; the entire contents of which are incorporated herein by reference.

FIELD

An embodiment described herein relates generally to a quantum key distribution device, a quantum key distribution system, and a quantum key distribution method.

BACKGROUND

A quantum key distribution system is configured with a transmitter, a receiver, and an optical fiber link that connects the transmitter and the receiver. The transmitter transmits photons to the receiver via the optical fiber link (a quantum communication channel). After that, the transmitter and the receiver exchange control information with each other, and share cryptographic keys. This technology is implemented using the technology generally referred to as quantum key distribution (QKD).

In order to share cryptographic keys between a transmitter and a receiver using quantum key distribution, it is necessary to perform a key distillation operation in the transmitter as well as in the receiver. The key distillation operation includes a sifting operation, an error correction operation, and a privacy amplification operation. As a result of performing the key distillation operation, the transmitter and the receiver share cryptographic keys. The amount of generation per unit time of the shared cryptographic keys is called a secure key rate. Being able to use a number of cryptographic keys enables performing high-speed and safer cryptographic data communication. Hence, it can be said that, higher the secure key rate, the more enhanced is the performance of a quantum key distribution system.

In such quantum key distribution systems, there is a system in which an optical processing device, a high-speed signal processing unit, and a central processing unit (CPU) are arranged in series for the purpose of quantum key distribution and, depending on the details of communication to be done with another communication device, switching is done between whether the key distillation operation is to be assigned to the high-speed signal processing unit or to the CPU. In this way, the processing load and the communication load required in the key distillation operation is distributed to achieve a high speed during the operations.

However, in such a quantum key distribution system, the optical processing device, the high-speed signal processing unit, and the CPU are connected in series; and the operations include sequential transfer of data. Hence, in case some of the operation modules (for example, the high-speed signal processing unit) stop operating, then the operations at the prior stage and the subsequent stage also get terminated. Moreover, the key distillation operation includes a plurality of different algorithms intended for the sifting operation, the error correction operation, and the privacy amplification operation. Hence, if the configuration includes only a single high-speed signal processing module, then it is not possible to have a high-speed signal processing unit with the most suitable configuration for each operation constituting the key distillation operation.

DETAILED DESCRIPTION

Figure 1:
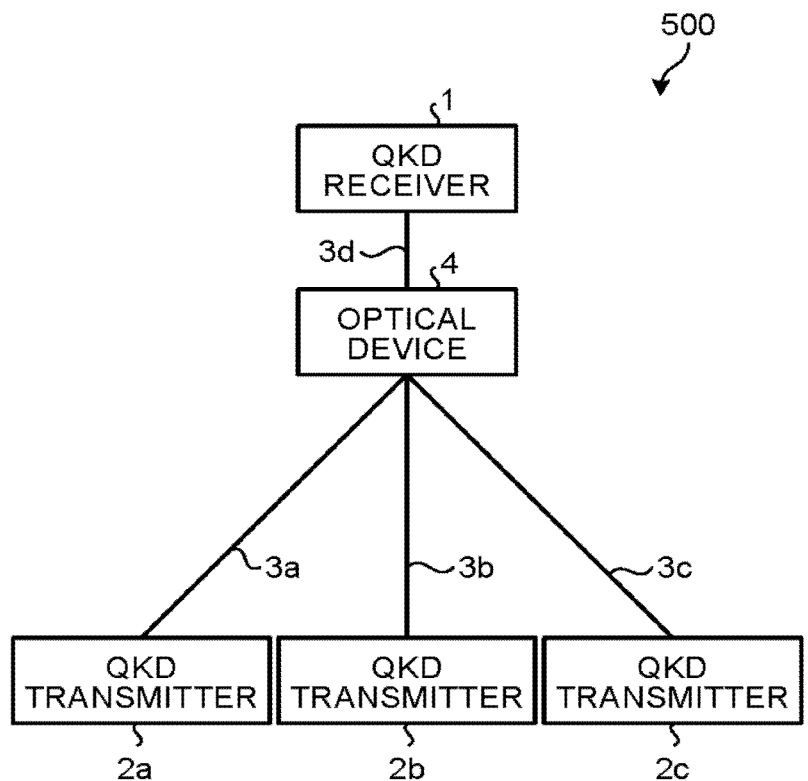
FIG. 1 is a diagram illustrating an example of the overall configuration of a quantum key distribution system.

According to an embodiment, a quantum key distribution device includes a first operation unit, a second operation unit, and a storage. The first operation unit is configured to perform a first operation that represents at least a part of a key distillation operation. The first operation unit includes a hardware circuit for performing at least a part of the first operation. The key distillation operation includes a sifting operation performed with respect to a photon bit string that is generated through quantum key distribution with another quantum key distribution device via a quantum communication channel. The second operation unit is configured to perform a second operation that represents the key distillation operation other than the first operation. The second operation unit includes a hardware circuit for performing at least a part of the second operation. The first operation unit stores intermediate data generated by the first operation in the storage. The second operation unit generates, by the second operation, a cryptographic key from the intermediate data stored in the storage. The cryptographic key is the same as that generated by the another quantum key distribution device.

An exemplary embodiment of a quantum key distribution device, a quantum key distribution system, and a quantum key distribution method according to the invention is described below in detail with reference to the accompanying drawings. In the accompanying drawings, the same constituent elements are referred to by the same reference numerals. However, the drawings are only schematic in nature, and the specific configuration should be determined by taking into account the explanation given below.

Figure 2:
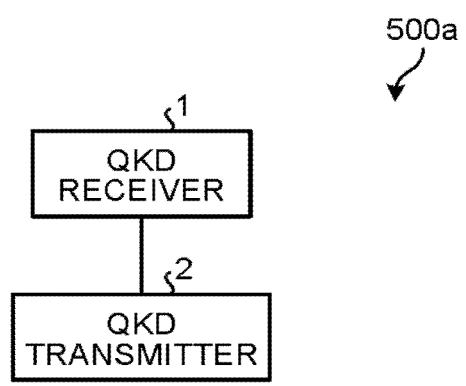
FIG. 2 is a diagram illustrating another example of the overall configuration of the quantum key distribution system.

FIG. 1 is a diagram illustrating an example of the overall configuration of a quantum key distribution system. FIG. 2 is a diagram illustrating another example of the overall configuration of the quantum key distribution system. Thus, explanation with reference to FIGS. 1 and 2 is the overall configuration of a quantum key distribution system 500.

As illustrated in FIG. 1, the explanation is given under the assumption that the quantum key distribution system 500 is, for example, a quantum access network (QAN) in which a plurality of QKD receivers (in FIG. 1, three QKD receivers) is connected to a single QKD receiver. Herein, the QAN is only an example of the quantum key distribution system. That is, the quantum key distribution system is not limited to a QAN. The quantum key distribution system 500 includes a QKD receiver 1, QKD transmitters 2a to 2c, and an optical device 4. The QKD receiver 1 is connected to the optical device 4 by an optical fiber link 3d serving as a quantum communication channel. Similarly, the QKD transmitters 2a to 2c are also connected to the optical device 4 by optical fiber links 3a to 3c, respectively, serving as quantum communication channels. In the following explanation, in the case of referring to the QKD transmitters 2a to 2c without distinguishing therebetween or in the case of collectively referring to the QKD transmitters 2a to 2c, they are simply referred to as a "QKD transmitter 2". Moreover, in FIG. 1, although the quantum key distribution system 500 is illustrated to have three QKD transmitters 2, that is not the only possible case. Alternatively, it is also possible to have some other number of QKD transmitters 2. If there is only a single QKD transmitter 2, then it can be directly connected to the QKD receiver 1 without having to use the optical device 4 in between.

Herein, for example, each of the QKD transmitters 2a to 2c sends, to the QKD receiver 1 via the optical device 4, a photon string that is made of single photons serving as the basis for generating cryptographic keys and that is generated based on a bit string (hereinafter, referred to as a "photon bit string" in the QKD transmitter 2) generated using random numbers. Moreover, each of the QKD transmitters 2a to 2c performs a sifting operation, an error correction (EC) operation, and a privacy amplification (PA) operation based on the photon bit string; and generates a cryptographic key. The details regarding the sifting operation, the EC operation, and the PA operation are given later. Moreover, in the case of referring to the sifting operation, the EC operation, and the PA operation without distinguishing therebetween or in the case of collectively referring to the sifting operation, the EC operation, and the PA operation; they are simply referred to as a "key distillation operation".

The QKD receiver 1 receives, from each of the QKD transmitters 2a to 2c via the optical device 4, the photon string made of single photons that serve as the basis for generating cryptographic keys. Then, the QKD receiver 1 performs a sifting operation, an error correction operation, and a PA operation based on photon bit strings that are obtained by reading the received photon bit strings, and generates cryptographic keys that are identical to the cryptographic keys generated by the QKD transmitters 2a to 2c, respectively. That is, the QKD receiver 1 and the QKD transmitter 2a generate and share identical cryptographic keys. Similarly, the QKD receiver 1 and the QKD transmitter 2b generate and share identical cryptographic keys. Moreover, the QKD receiver 1 and the QKD transmitter 2c generate and share identical cryptographic keys.

The optical fiber links 3a to 3d serve as quantum communication channels through which the single photons output by the QKD receiver 1 are transmitted.

The optical device 4 relays the photon strings, which are made of single photons output from the QKD transmitters 2a to 2c, to the QKD receiver 1.

In the quantum key distribution system 500 including the QKD receiver 1 and the QKD transmitters 2, in case the single photons transmitted by the QKD transmitters 2 are tapped by a wiretapper from the optical fiber links 3a to 3d serving as the quantum communication channels, the photons undergo physical changes thereby enabling the QKD receiver 1 that has received the photons to know that the photons have been tapped by a wiretapper.

Meanwhile, although not illustrated in FIG. 1, aside from the quantum communication channels in the form of the optical fiber links 3a to 3d, the QKD receiver 1 and each of the QKD transmitters 2a to 2c are connected to each other by communication cables (classical communication channels) that are used in communicating regular digital data of 0s and 1s. A classical communication channel need not be a wired communication channel, and can be a wireless communication channel. Moreover, the quantum communication channels in the form of the optical fiber links 3a to 3d need not be different entities from the classical communication channels for communicating digital data. That is, using the wavelength division multiplex (WDM) technology, the same optical fiber can be configured to have a photon communication channel for sending and receiving single photons and an optical data communication channel for communicating optical data. In that case, the photon communication channel serves as a quantum communication channel, while the optical data communication channel serves as a classical communication channel.

Meanwhile, in the case of collectively referring to the QKD receiver 1 and the QKD transmitters 2, they are referred to as a "QKD device".

Herein, it is assumed that the quantum key distribution system 500 is a quantum access network (QAN) in which a plurality of QKD transmitters is connected to a single QKD receiver. However, that is only exemplary, and the quantum key distribution system 500 is not limited to that example. Alternatively, for example, it is also possible to have a quantum key distribution system in which a plurality of QKD receivers 1 is connected to a single QKD transmitter 2. Moreover, instead of having the configuration of the quantum key distribution system 500 illustrated in FIG. 1 in which a plurality of QKD transmitters 2 is connected to a single QKD receiver 1 via the optical device 4, it is also possible to have a basic configuration such as a quantum key distribution system 500a illustrated in FIG. 2 in which a single QKD receiver 1 is directly connected to a single QKD transmitter 2.

Figure 3:
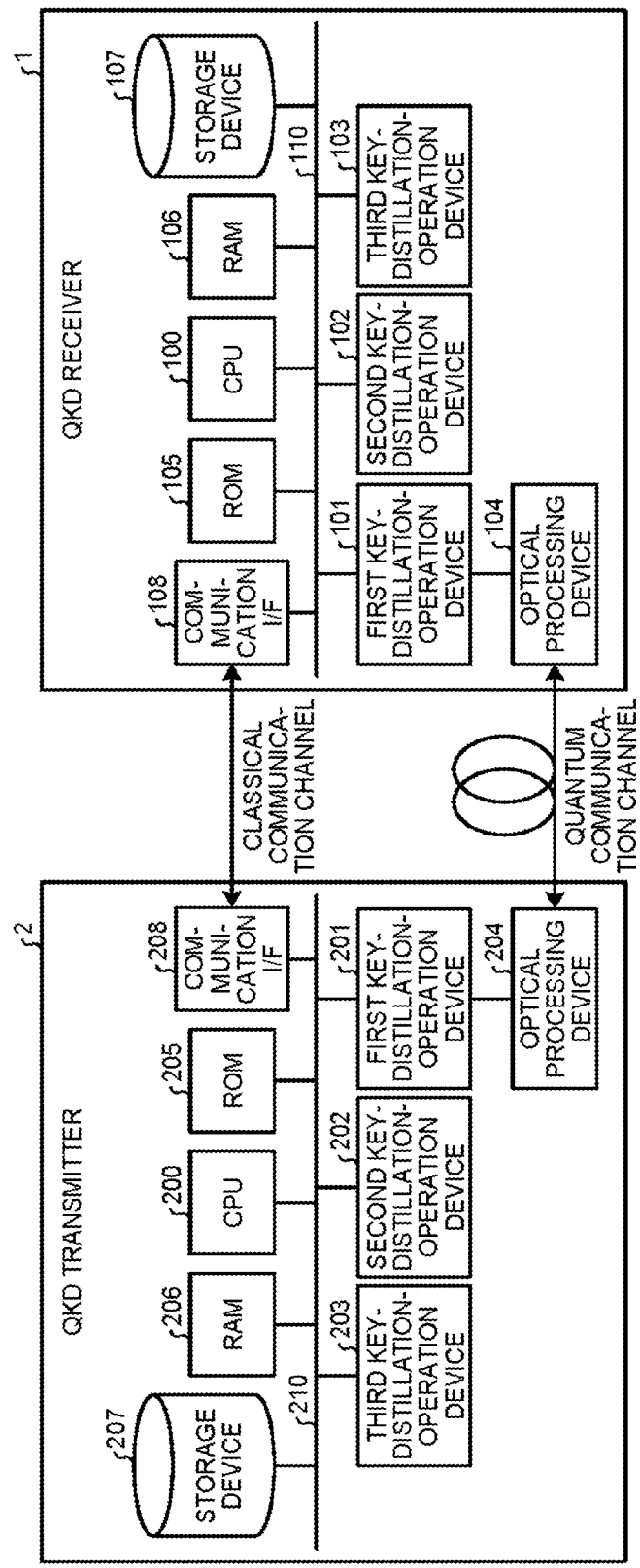
FIG. 3 is an exemplary hardware configuration diagram of a QKD device.

FIG. 3 is an exemplary hardware configuration diagram of a QKD device. Thus, the explanation of a hardware configuration of the QKD receiver 1 and the QKD transmitter 2 is given below with reference to FIG. 3.

As illustrated in FIG. 3, the QKD receiver 1 includes a central processing unit (CPU) 100, a first key-distillation-operation device 101, a second key-distillation-operation device 102, a third key-distillation-operation device 103, an optical processing device 104, a read only memory (ROM) 105, a random access memory (RAM) 106, a storage device 107, and a bus 110 that interconnects the other constituent elements.

The CPU 100 is a processor that controls the operations of the entire QKD receiver 1.

The first key-distillation-operation device 101 is a dedicated hardware device for performing a sifting operation to generate a shared bit string (described later) from a photon bit string received from the optical processing device 104. Then, the first key-distillation-operation device 101 stores the shared bit string in the storage device 107. Herein, the first key-distillation-operation device 101 is configured using a hardware circuit such as an application specific integrated circuit (ASIC), a field-programmable gate array (FPGA), or some other integrated circuit. Alternatively, the hardware circuit can be a coprocessor or a graphic processing unit (GPU), or can have a configuration including such a component.

The second key-distillation-operation device 102 is a dedicated hardware device for performing an EC operation that includes correcting the bit errors of the shared bit string, which is generated by the first key-distillation-operation device 101 and which is stored in the storage device 107, and generating a post-correction bit string. Then, the second key-distillation-operation device 102 stores the post-correction bit string in the storage device 107. Herein, the second key-distillation-operation device 102 is configured using a hardware circuit such as an ASIC, an FPGA, or some other integrated circuit. Alternatively, the hardware circuit can be a coprocessor or a GPU, or can have a configuration including such a component.

The third key-distillation-operation device 103 is a dedicated hardware device for performing a PA operation with respect to the post-correction bit string, which is generated by the second key-distillation-operation device 102 and which is stored in the storage device 107, in order to remove such bits from the number of errors corrected by the second key-distillation-operation device 102 which are likely to have been tapped by a wiretapper during the sifting operation and the EC operation, and to generate a key bit string (a cryptographic key). Then, the third key-distillation-operation device 103 stores the cryptographic key in the storage device 107. Herein, the third key-distillation-operation device 103 is configured using a hardware circuit such as an ASIC, an FPGA, or some other integrated circuit. Alternatively, the hardware circuit can be a coprocessor or a GPU, or can have a configuration including such a component.

The optical processing device 104 is an optical device that receives a photon string from the QKD transmitter 2 via a quantum communication channel, and obtains a photon bit string by reading the received photon string based on base information generated in a random manner. Meanwhile, in order to send the photon bit string and the base information to the first key-distillation-operation device 101, the optical processing device 104 is electrically connected to the first key-distillation-operation device 101.

The ROM 105 is a nonvolatile storage device used in storing computer programs that are executed by the CPU 100 for controlling various functions. The RAM 106 is a volatile storage device that serves as the work area of the CPU 100.

The storage device 107 is a nonvolatile storage device used in storing various computer programs executed by the CPU 100, the shared bit string generated by the first key-distillation-operation device 101, the post-correction bit string generated by the second key-distillation-operation device 102, and the cryptographic key generated by the third key-distillation-operation device 103. The storage device 107 is a storage device such as a hard disk drive (HDD), a solid state drive (SSD), a flash memory, or an optical disk in which information can be stored in an electrical, magnetic, or optical manner.

A communication I/F 108 is an interface that enables data communication with the QKD transmitter 2 via a classical communication channel of a network such as a local area network (LAN) or a wireless network. For example, the communication I/F 108 is a wired network interface compatible to Ethernet (registered trademark) such as 10Base-T, 100Base-TX, or 1000Base-T.

In FIG. 3, although it is illustrated that the optical processing device 104 is connected to the first key-distillation-operation device 101, that is not the only possible case. Alternatively, the optical processing device 104 can be connected to the bus 110 so that the photon bit string is sent to the first key-distillation-operation device 101 via the bus 110.

Moreover, in FIG. 3, it is illustrated that the first key-distillation-operation device 101, the second key-distillation-operation device 102, and the third key-distillation-operation device 103 are independent hardware devices; it is not the only possible case. Alternatively, for example, the first key-distillation-operation device 101, the second key-distillation-operation device 102, and the third key-distillation-operation device 103 can be configured as a single hardware device. Still alternatively, the second key-distillation-operation device 102 and the third key-distillation-operation device 103 can be configured as a single hardware device, so that a total of two hardware devices are present. For example, if the first key-distillation-operation device 101 and the second key-distillation-operation device 102 are configured as a single hardware device, then the first key-distillation-operation device 101 and the second key-distillation-operation device 102 together represent a "first operation unit", and the sifting operation and the EC operation constituting the key distillation operation represent a "first operation". The remaining third key-distillation-operation device 103 represents a "second operation unit", and the PA operation constituting the key distillation operation represents a "second operation".

Meanwhile, as illustrated in FIG. 3, the QKD transmitter 2 includes a CPU 200, a first key-distillation-operation device 201, a second key-distillation-operation device 202, a third key-distillation-operation device 203, an optical processing device 204, a ROM 205, a RAM 206, a storage device 207, a communication I/F 208, and a bus 210 that interconnects the other constituent elements.

The CPU 200 is a processor that controls the operations of the entire QKD transmitter 2.

The first key-distillation-operation device 201 is a dedicated hardware device for performing a sifting operation to generate a shared bit string from a photon bit string received from the optical processing device 204. The first key-distillation-operation device 201 stores the shared bit string in the storage device 207. Herein, the first key-distillation-operation device 201 is configured using a hardware circuit such as an ASIC, an FPGA, or some other integrated circuit. Alternatively, the hardware circuit can be a coprocessor or a GPU, or can have a configuration including such a component.

The second key-distillation-operation device 202 is a dedicated hardware device for performing an EC operation that includes correcting the bit errors of the shared bit string, which is generated by the first key-distillation-operation device 201 and which is stored in the storage device 207, and generating a post-correction bit string. Then, the second key-distillation-operation device 202 stores the post-correction bit string in the storage device 207. Herein, the second key-distillation-operation device 202 is configured using a hardware circuit such as an ASIC, an FPGA, or some other integrated circuit. Alternatively, the hardware circuit can be a coprocessor or a GPU, or can have a configuration including such a component.

The third key-distillation-operation device 203 is a dedicated hardware device for performing a PA operation with respect to the post-correction bit string, which is generated by the second key-distillation-operation device 202 and which is stored in the storage device 207, in order to remove such bits from the number of errors corrected by the second key-distillation-operation device 202 which are likely to have been tapped by a wiretapper during the sifting operation and the EC operation, and to generate a key bit string (a cryptographic key). Then, the third key-distillation-operation device 203 stores the cryptographic key in the storage device 207. Herein, the third key-distillation-operation device 203 is configured using a hardware circuit such as an ASIC, an FPGA, or some other integrated circuit. Alternatively, the hardware circuit can be a coprocessor or a GPU, or can have a configuration including such a component.

The optical processing device 204 is an optical device that sends, to the QKD receiver 1 via a quantum communication channel, a photon string that is made of single photons having a state based on base information generated in a random manner as against a bit string (a photon bit string) generated using random numbers. Meanwhile, in order to send the photon bit string and the base information to the first key-distillation-operation device 201, the optical processing device 204 is electrically connected to the first key-distillation-operation device 201.

The ROM 205 is a nonvolatile storage device used in storing computer programs that are executed by the CPU 200 for controlling various functions. The RAM 206 is a volatile storage device that serves as the work area of the CPU 200.

The storage device 207 is a nonvolatile storage device used in storing various computer programs executed by the CPU 200, the shared bit string generated by the first key-distillation-operation device 201, the post-correction bit string generated by the second key-distillation-operation device 202, and the cryptographic key generated by the third key-distillation-operation device 203. The storage device 207 is a storage device such as a hard disk drive (HDD), a solid state drive (SSD), a flash memory, or an optical disk in which information can be stored in an electrical, magnetic, or optical manner.

The communication I/F 208 is an interface that enables data communication with the QKD receiver 1 via a classical communication channel of a network such as a local area network (LAN) or a wireless network. For example, the communication I/F 208 is a wired network interface compatible to Ethernet (registered trademark) such as 10Base-T, 100Base-TX, or 1000Base-T.

In FIG. 3, although it is illustrated that the optical processing device 204 is connected to the first key-distillation-operation device 201, that is not the only possible case. Alternatively, the optical processing device 204 can be connected to the bus 210 so that the photon bit string is sent to the first key-distillation-operation device 201 via the bus 210.

Moreover, in FIG. 3, it is illustrated that the first key-distillation-operation device 201, the second key-distillation-operation device 202, and the third key-distillation-operation device 203 are independent hardware devices; it is not the only possible case. Alternatively, for example, the first key-distillation-operation device 201, the second key-distillation-operation device 202, and the third key-distillation-operation device 203 can be configured as a single hardware device. Still alternatively, the second key-distillation-operation device 202 and the third key-distillation-operation device 203 can be configured as a single hardware device, so that a total of two hardware devices are present. For example, if the first key-distillation-operation device 201 and the second key-distillation-operation device 202 are configured as a single hardware device, then the first key-distillation-operation device 201 and the second key-distillation-operation device 202 together represent a "first operation unit", and the sifting operation and the EC operation constituting the key distillation operation represent a "first operation". The remaining third key-distillation-operation device 203 represents a "second operation unit", and the PA operation constituting the key distillation operation represents a "second operation".

As described above, in the QKD receiver 1 and the QKD transmitter 2, a dedicated hardware device is installed for the purpose of performing each of the sifting operation, the EC operation, and the PA operation. For example, if it is attempted to perform the series of operations constituting the key distillation operation using a single dedicated hardware device, a hardware device capable of performing such operations is not commercially available. Hence, it becomes necessary to design/implement a capable hardware device thereby leading to an increase in the cost. For example, during the PA operation, in order to perform efficient operations in light of the safety of quantum cryptography, the post-correction bit string that is input needs to be increased in size to a large extent (for example, to 100 [Mbit]). As a result, it becomes likely that the circuit size is difficult to implement in a single hardware device. Not only that, each type of key distillation operation requires different hardware properties. In contrast, as illustrated in FIG. 3, when a dedicated hardware device is installed for each operation constituting the key distillation operation, it becomes possible to reduce the size of each individual hardware device. That enables using a commercial hardware device, thereby enabling achieving reduction in the cost. Moreover, the most suitable hardware device for each operation constituting the key distillation operation can be selected. Hence, the key distillation operation can be performed at a high speed.

Figure 4:
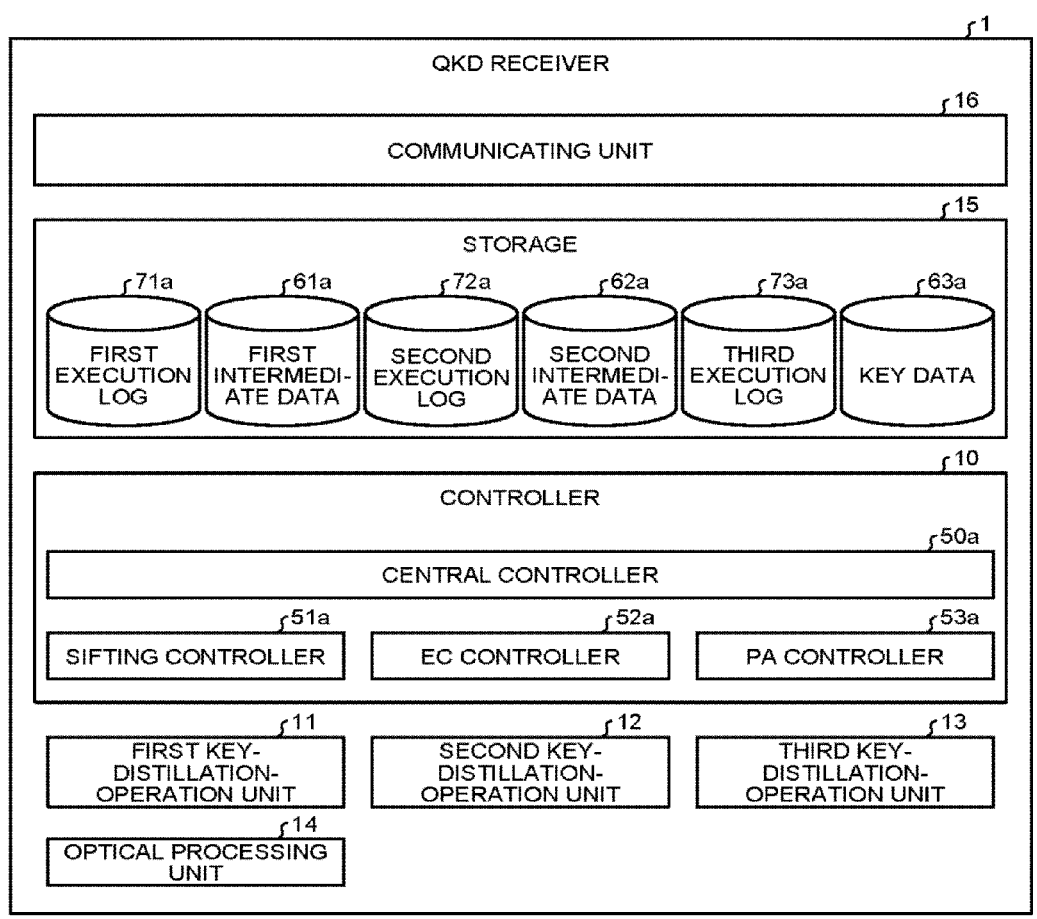
FIG. 4 is a diagram illustrating an exemplary functional block configuration of a QKD receiver.

FIG. 4 is a diagram illustrating an exemplary functional block configuration of a QKD receiver. Thus, explained with reference to FIG. 4 is a functional block configuration of the QKD receiver 1.

As illustrated in FIG. 4, the QKD receiver 1 includes a controller 10, a first key-distillation-operation unit 11, a second key-distillation-operation unit 12, a third key-distillation-operation unit 13, an optical processing unit 14, a storage 15, and a communicating unit 16.

The first key-distillation-operation unit 11 is a functional unit that receives a photon bit string and base information from the optical processing unit 14. Then, the first key-distillation-operation unit 11 receives base information, which is generated by the QKD transmitter 2 (an optical processing unit 24 illustrated in FIG. 5 described later) in a random manner for the purpose of sending a photon string, via the communicating unit 16 and a classical communication channel. Moreover, the first key-distillation-operation unit 11 performs a sifting operation that includes comparing the base information received from the optical processing unit 14 with the base information received from a first key-distillation-operation unit 21 (described later); extracting the bits corresponding to the matching portion from the photon bit string; and generating a shared bit string. Then, the first key-distillation-operation unit 11 stores the shared bit string, which is generated as a result of the sifting operation, as first intermediate data 61*a* in the storage 15; and stores log data containing the parameters obtained as a result of the sifting operation (for example, information about the quantum bit error rate in the sifting operation) as a first execution log 71*a* in the storage 15. The first key-distillation-operation unit 11 is implemented using the first key-distillation-operation device 101 illustrated in FIG. 3. Herein, the length of the shared bit string is determined based on the base information generated in a random manner by the optical processing unit 24 and the first key-distillation-operation unit 11. Hence, if the selection of base information is truly random in nature; then, statistically, the length of the shared bit string is substantially half of the photon bit string. Meanwhile, the sifting operation explained herein is only exemplary, and any other method can alternatively be implemented.

The second key-distillation-operation unit 12 is a functional unit that exchanges control data (EC information) with a second key-distillation-operation unit 22 (described later) via the communicating unit 16 and a classical communication channel; and performs an EC operation for correcting the bit errors in the shared bit string and generating a post-correction bit string. Then, the second key-distillation-operation unit 12 stores the post-correction bit string, which is generated as a result of the EC operation, as second intermediate data 62a in the storage 15; and stores log data containing the parameters obtained during the EC operation (for example, information about the error rate obtained as a result of performing correction in the EC operation) as a second execution log 72a in the storage 15. The second key-distillation-operation unit 12 is implemented using the second key-distillation-operation device 102 illustrated in FIG. 3. Herein, the post-correction bit string generated by the second key-distillation-operation unit 12 matches with the post-correction bit string that is generated by the second key-distillation-operation unit 22 by performing correction with respect to the shared bit string. Moreover, since the post-correction bit string is generated by correcting the bit errors in the shared bit string, the length of the post-correction bit string is identical to the length of the shared bit string.

The third key-distillation-operation unit 13 is a functional unit that sends control data (PA information) to a third key-distillation-operation unit 23 (described later) via the communicating unit 16 and a classical communication channel; and performs a PA operation that includes removing such bits from the number of errors corrected by the second key-distillation-operation unit 12 which are likely to have been tapped by a wiretapper during the sifting operation and the EC operation, and generating a key bit string (a cryptographic key). Then, the third key-distillation-operation unit 13 stores the cryptographic key, which is generated as a result of the PA operation, as key data 63a in the storage 15; and stores log data containing the parameters obtained as a result of performing the PA operation as a third execution log 73a in the storage 15. The third key-distillation-operation unit 13 is implemented using the third key-distillation-operation device 103 illustrated in FIG. 3. Meanwhile, the PA operation explained herein is only exemplary, and any other method can alternatively be implemented.

In the case of referring to the first key-distillation-operation unit 11, the second key-distillation-operation unit 12, and the third key-distillation-operation unit 13 without distinguishing therebetween or in the case of collectively referring to the first key-distillation-operation unit 11, the second key-distillation-operation unit 12, and the third key-distillation-operation unit 13; they are simply referred to as a "key distillation operation unit".

The optical processing unit 14 is a functional unit that receives a photon string from the QKD transmitter 2 (the optical processing unit 24) via a quantum communication channel, and obtains a photon bit string by reading the received photon string based on base information generated in a random manner. Then, the optical processing unit 14 sends the photon bit string and the base information to the first key-distillation-operation unit 11. Herein, the optical processing unit 14 is implemented using the optical processing device 104 illustrated in FIG. 3.

The storage 15 is a functional unit that is used in storing a variety of data. As illustrated in FIG. 4, examples of the data stored in the storage 15 include the first intermediate data 61a, the second intermediate data 62a, the key data 63a, the first execution log 71a, the second execution log 72a, and the third execution log 73a. The storage 15 is implemented using the storage device 107 illustrated in FIG. 3. However, the storage 15 is not limited to be implemented using the storage device 107. Alternatively, the storage 15 can be implemented using a volatile storage device such as the RAM 106. Meanwhile, in the QKD receiver 1, in the case of referring to the first intermediate data 61a and the second intermediate data 62a without distinguishing therebetween or in the case of collectively referring to the first intermediate data 61a and the second intermediate data 62a, they are simply referred to as "intermediate data". Moreover, in the QKD receiver 1, in the case of referring to the first execution log 71a, the second execution log 72a, and the third execution log 73a without distinguishing therebetween or in the case of collectively referring to the first execution log 71a, the second execution log 72a, and the third execution log 73a; they are simply referred to as an "execution log".

As described above, the first intermediate data 61a represents the shared bit string generated as a result of the sifting operation performed by the first key-distillation-operation unit 11. The second intermediate data 62a represents the post-correction bit string generated as a result of the EC operation performed by the second key-distillation-operation unit 12. The key data 63a represents the cryptographic key generated as a result of the PA operation performed by the third key-distillation-operation unit 13.

The first execution log 71a represents the log data containing the parameters obtained as a result of the sifting operation performed by the first key-distillation-operation unit 11. For example, the first execution log 71a includes information about the quantum bit error rate in the sifting operation or includes information that is appended during the sifting operation and that is to be used in performing an EC operation by the second key-distillation-operation unit 12 disposed at the subsequent stage.

The second execution log 72a represents the log data containing the parameters obtained during the EC operation performed by the second key-distillation-operation unit 12. For example, the second execution log 72a includes the information about the error rate obtained by the second key-distillation-operation unit 12 as a result of performing the EC operation or includes information that is appended during the EC operation and that is to be used in performing the PA operation by the third key-distillation-operation unit 13 disposed at the subsequent stage.

The third execution log 73a represents the log data containing the parameters obtained by the third key-distillation-operation unit 13 as a result of performing the PA operation.

Meanwhile, the intermediate data, the key data 63a, and the execution data can be stored in the storage 15 according to any arbitrary storage method. For example, it is possible to think of storing the intermediate data, the key data 63a, and the execution data as files of a file system that is available independent of the type of medium. For example, if the storage 15 is used in building a file system in the RAM 106, then a file system that is accessible at high speeds becomes available.

The communicating unit 16 is a functional unit that, under the control of the controller 10, functions as an interface enabling the formation of a classical communication channel for each key distillation operation unit to send control data to and receive control data from the QKD transmitter 2. The communicating unit 16 is implemented using the communication I/F 108 illustrated in FIG. 3. Moreover, the communicating unit 16 can either be an interface for wired communication or be an interface for wireless communication.

The controller 10 is a functional unit that controls the overall operations of the key distillation operation units. As illustrated in FIG. 4, the controller 10 includes a central controller 50a, a sifting controller 51a, an EC controller 52a, and a PA controller 53a. Moreover, the controller 10 is implemented using the CPU 100 illustrated in FIG. 3.

The central controller 50a is a functional unit that monitors the operation result (the execution log), the operation speed, the operational parameters, the intermediate data, and the key data 63a of the key distillation operation units. Based on the result of monitoring, the central controller 50a instructs the sifting controller 51a, the EC controller 52a, and the PA controller 53a about the execution timing and the operational parameters of the respective operations or about the changes in the execution timing and the operational parameters of the respective operations. The central controller 50a is implemented using a computer program executed by the CPU 100 illustrated in FIG. 3.

For example, based on the size of the execution log, the intermediate data, and the key data 63a stored in the storage 15; the central controller 50a instructs the sifting controller 51a about the change in the size of the shared bit string and adjusts the size of the memory area in the storage 15 used by the first key-distillation-operation unit 11. Moreover, for example, based on the quantum bit error rate specified in the first intermediate data 61a that represents the execution log of the first key-distillation-operation unit 11 as stored in the storage 15, the central controller 50a instructs the EC controller 52a about the correction in the parameters of the algorithm used in the EC operation performed by the second key-distillation-operation unit 12. That leads to an enhancement in the efficiency of the EC operation. Furthermore, for example, based on the size of the execution log, the intermediate data, and the key data 63a stored in the storage 15; the central controller 50a instructs the PA controller 53a to change the execution timing of the PA operation performed by the third key-distillation-operation unit 13 and reduces the size of the memory area of the storage 15 that is used for storing the second intermediate data 62a. As a result, there is an increase in the overall speed for generating the final key data 63a (a cryptographic key).

In this way, the central controller 50a is able to get to know about the operation result (the execution log), the operation speed, the operational parameters, the intermediate data, and the cryptographic key of the key distillation operation units; and accordingly controls the operations of the key distillation operation units in a comprehensive manner. Meanwhile, sometimes the operation speeds of the key distillation operation units are different or sometimes, as the available memory area in the storage 15 approaches the upper limit, there occurs a bottleneck in some of the key distillation operation units and thus the overall operation speed does not increase by a sufficient amount. In such cases, the central controller 50a changes the operational parameters and the execution timing of the key distillation operation units as well as changes the available memory area so as to adjust the balance of the operation speeds of the key distillation operation units. That enables achieving enhancement in the overall quantum key distribution speed.

Meanwhile, in the case of performing data communication using a classical communication channel, the central controller 50a performs data communication by controlling only the communicating unit 16. As a result, it becomes possible to achieve sequencing of the key distillation operation.

Moreover, the central controller 50a monitors the volume of stored data in the storage 15 and monitors the communicating unit 16. As a result, for example, when there is a constraint on the available area in the storage 15, the central controller 50a instructs the sifting controller 51a, the EC controller 52a, and the PA controller 53a to adjust the size of the intermediate data and the cryptographic key output during the key distillation operation, thereby enabling avoiding the available memory crunch of the storage 15. Moreover, for example, when there is a constraint on the communication band in the communicating unit 16, the central controller 50a instructs the sifting controller 51a, the EC controller 52a, and the PA controller 53a to switch to an algorithm (operation details) having a smaller volume of data communication during the key distillation operation, thereby enabling avoiding the communication band crunch of the communicating unit 16. On the other hand, when a sufficient communication band is available, the central controller 50a can switch to an algorithm having a large volume of data communication during the key distillation operation.

The sifting controller 51a is a functional unit that functions as a driver for controlling the operations of the first key-distillation-operation device 101. Moreover, the sifting controller 51a makes the first key-distillation-operation unit 11 perform the sifting operation according to instructions and modifications about the operational parameters and the execution timing as issued by the central controller 50a. Furthermore, the sifting controller 51a performs communication control with respect to the communicating unit 16 with the aim of communicating the base information, which is used by the first key-distillation-operation unit 11 in performing the sifting operation, with the QKD transmitter 2. Herein, the sifting controller 51a is implemented using a computer program executed by the CPU 100 illustrated in FIG. 3. Meanwhile, although the sifting operation is performed by the first key-distillation-operation unit 11 as described above, some part of the sifting operation can alternatively be performed by the sifting controller 51a. In that case, the first key-distillation-operation unit 11 and the sifting controller 51a, which performs some part of the sifting operation, constitute the "first key-distillation-operation unit".

The EC controller 52a is a functional unit that functions as a driver for controlling the operations of the second key-distillation-operation device 102. Moreover, the EC controller 52a makes the second key-distillation-operation unit 12 perform the EC operation according to instructions and modifications about the operational parameters and the execution timing as issued by the central controller 50a. Furthermore, the EC controller 52a performs communication control with respect to the communicating unit 16 with the aim of communicating the EC information, which is used by the second key-distillation-operation unit 12 in performing the EC operation, with the QKD transmitter 2. Herein, the EC controller 52a is implemented using a computer program executed by the CPU 100 illustrated in FIG. 3. Meanwhile, although the EC operation is performed by the second key-distillation-operation unit 12 as described above, some part of the EC operation can alternatively be performed by the EC controller 52a. In that case, the second key-distillation-operation unit 12 and the EC controller 52a, which performs some part of the EC operation, constitute the "second key-distillation-operation unit".

The PA controller 53a is a functional unit that functions as a driver for controlling the operations of the third key-distillation-operation device 103. Moreover, the PA controller 53a makes the third key-distillation-operation unit 13 perform the PA operation according to instructions and modifications about the operational parameters and the execution timing as issued by the central controller 50a. Furthermore, the PA controller 53a performs communication control with respect to the communicating unit 16 with the aim of communicating the PA information, which is used by the third key-distillation-operation unit 13 in performing the PA operation, with the QKD transmitter 2. Herein, the PA controller 53a is implemented using a computer program executed by the CPU 100 illustrated in FIG. 3. Meanwhile, although the PA operation is performed by the third key-distillation-operation unit 13 as described above, some part of the PA operation can alternatively be performed by the PA controller 53a. In that case, the third key-distillation-operation unit 13 and the PA controller 53a, which performs some part of the PA operation, constitute the "third key-distillation-operation unit".

Herein, it is assumed that the central controller 50a, the sifting controller 51a, the EC controller 52a, and the PA controller 53a are implemented using computer programs executed by the CPU 100. However, that is not the only possible case. Alternatively, at least some of the functions can be implemented using hardware circuitry.

Moreover, the central controller 50a, the sifting controller 51a, the EC controller 52a, and the PA controller 53a of the controller 10 represent the respective functions in a conceptual manner, and the configuration thereof is not limited to the explanation given above.

Figure 5:
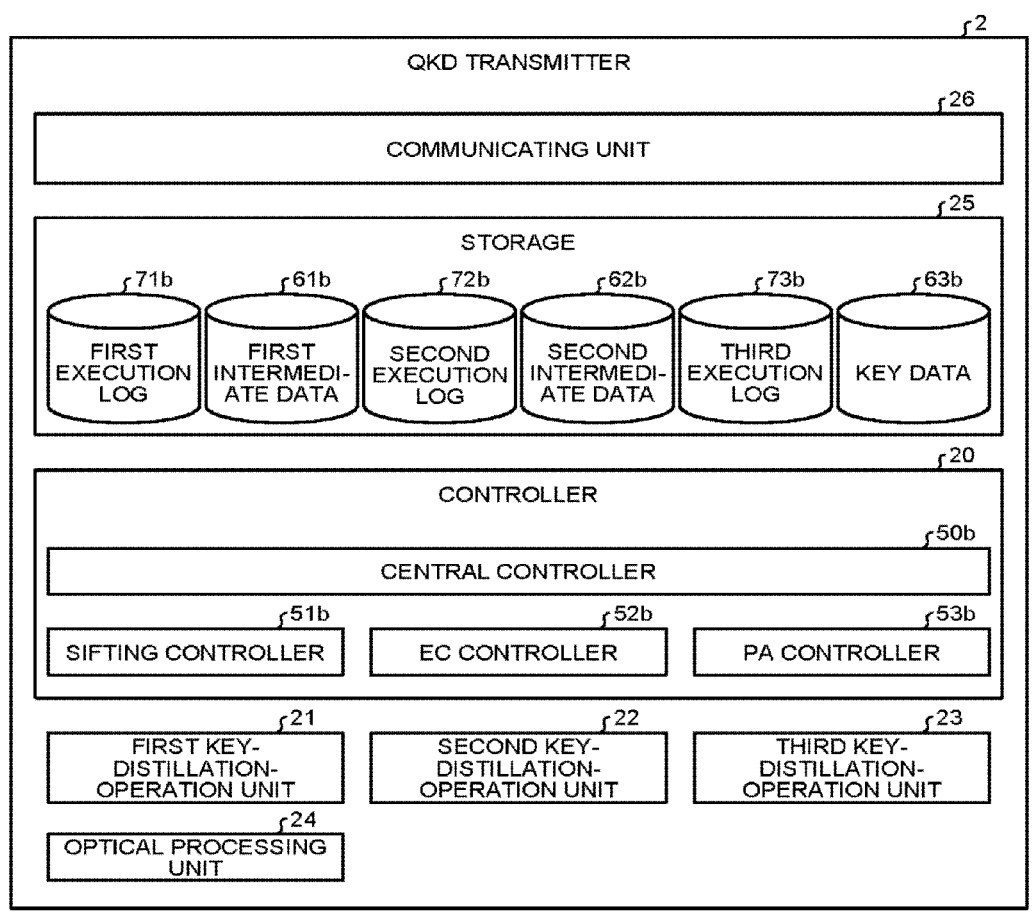
FIG. 5 is a diagram illustrating an exemplary functional block configuration of a QKD transmitter.

FIG. 5 is a diagram illustrating an exemplary functional block configuration of a QKD transmitter. Thus, explained with reference to FIG. 5 is a functional block configuration of the QKD transmitter 2.

As illustrated in FIG. 5, the QKD transmitter 2 includes a controller 20, the first key-distillation-operation unit 21, the second key-distillation-operation unit 22, the third key-distillation-operation unit 23, the optical processing unit 24, a storage 25, and a communicating unit 26.

The first key-distillation-operation unit 21 is a functional unit that receives a photon bit string and base information from the optical processing unit 24. Then, the first key-distillation-operation unit 21 receives base information, which is generated by the QKD receiver (the optical processing unit 14) in a random manner for the purpose of reading a photon string, via the communicating unit 26 and a classical communication channel. Moreover, the first key-distillation-operation unit 21 performs a sifting operation that includes comparing the base information received from the optical processing unit 24 with the base information received from the first key-distillation-operation unit 11; extracting the bits corresponding to the matching portion from the photon bit string; and generating a shared bit string. Then, the first key-distillation-operation unit 21 stores the shared bit string, which is generated as a result of the sifting operation, as first intermediate data 61b in the storage 25; and stores log data containing the parameters obtained as a result of the sifting operation (for example, information about the quantum bit error rate in the sifting operation) as a first execution log 71b in the storage 25. The first key-distillation-operation unit 21 is implemented using the first key-distillation-operation device 201 illustrated in FIG. 3. Herein, the length of the shared bit string is determined based on the base information generated in a random manner by the optical processing unit 24 and the first key-distillation-operation unit 11. Hence, if the selection of base information is truly random in nature; then, statistically, the length of the shared bit string is substantially half of the photon bit string. Meanwhile, the sifting operation explained herein is only exemplary, and any other method can alternatively be implemented.

The second key-distillation-operation unit 22 is a functional unit that exchanges control data (EC information) with the second key-distillation-operation unit 12 via the communicating unit 26 and a classical communication channel; and performs an EC operation for correcting the bit errors in the shared bit string and generating a post-correction bit string. Then, the second key-distillation-operation unit 22 stores the post-correction bit string, which is generated as a result of the EC operation, as second intermediate data 62b in the storage 25; and stores log data containing the parameters obtained during the EC operation (for example, information about the error rate obtained as a result of performing correction in the EC operation) as a second execution log 72b in the storage 25. The second key-distillation-operation unit 22 is implemented using the second key-distillation-operation device 202 illustrated in FIG. 3. Herein, the post-correction bit string generated by the second key-distillation-operation unit 22 matches with the post-correction bit string that is generated by the second key-distillation-operation unit 12 by performing correction with respect to the shared bit string. Moreover, since the post-correction bit string is generated by correcting the bit errors in the shared bit string, the length of the post-correction bit string is identical to the length of the shared bit string.

The third key-distillation-operation unit 23 is a functional unit that receives control data (PA information) from the third key-distillation-operation unit 13 via the communicating unit 26 and a classical communication channel; and performs a PA operation that includes removing such bits from the number of errors corrected by the second key-distillation-operation unit 22 which are likely to have been tapped by a wiretapper during the sifting operation and the EC operation, and generating a key bit string (a cryptographic key). Then, the third key-distillation-operation unit 23 stores the cryptographic key, which is generated as a result of the PA operation, as key data 63b in the storage 25; and stores log data containing the parameters obtained as a result of performing the PA operation as a third execution log 73b in the storage 25. The third key-distillation-operation unit 23 is implemented using the third key-distillation-operation device 203 illustrated in FIG. 3. Meanwhile, the PA operation explained herein is only exemplary, and any other method can alternatively be implemented.

In the case of referring to the first key-distillation-operation unit 21, the second key-distillation-operation unit 22, and the third key-distillation-operation unit 23 without distinguishing therebetween or in the case of collectively referring to the first key-distillation-operation unit 21, the second key-distillation-operation unit 22, and the third key-distillation-operation unit 23; they are simply referred to as a "key distillation operation unit".

The optical processing unit 24 is a functional unit that generates a photon string which is made of single photons having a state based on base information generated in a random manner as against a bit string (a photon bit string) generated using random numbers. Then, the optical processing unit 24 sends the generated photon string to the QKD receiver 1 (the optical processing unit 14) via a quantum communication channel. Moreover, the optical processing unit 24 sends the photon bit string and the base information to the first key-distillation-operation unit 21. Herein, the optical processing unit 24 is implemented using the optical processing device 204 illustrated in FIG. 3.

The storage 25 is a functional unit that is used in storing a variety of data. As illustrated in FIG. 5, examples of the data stored in the storage 25 include the first intermediate data 61$b$, the second intermediate data 62$b$, the key data 63$b$, the first execution log 71$b$, the second execution log 72$b$, and the third execution log 73$b$. Herein, regarding the first intermediate data 61$b$, the second intermediate data 62$b$, the key data 63$b$, the first execution log 71$b$, the second execution log 72$b$, and the third execution log 73$b$; the details are identical to the first intermediate data 61$a$, the second intermediate data 62$a$, the key data 63$a$, the first execution log 71$a$, the second execution log 72$a$, and the third execution log 73$a$, respectively. Hence, the relevant explanation is not repeated. The storage 25 is implemented using the storage device 207 illustrated in FIG. 3. However, the storage 25 is not limited to be implemented using the storage device 207. Alternatively, the storage 25 can be implemented using a volatile storage device such as the RAM 206. Meanwhile, in the QKD transmitter 2, in the case of referring to the first intermediate data 61$b$ and the second intermediate data 62$b$ without distinguishing therebetween or in the case of collectively referring to the first intermediate data 61$b$ and the second intermediate data 62$b$, they are simply referred to as "intermediate data". Furthermore, in the QKD transmitter 2, in the case of referring to the first execution log 71$b$, the second execution log 72$b$, and the third execution log 73$b$ without distinguishing therebetween or in the case of collectively referring to the first execution log 71$b$, the second execution log 72$b$, and the third execution log 73$b$; they are simply referred to as an "execution log".

The communicating unit 26 is a functional unit that, under the control of the controller 20, functions as an interface enabling the formation of a classical communication channel for each key distillation operation unit to send control data to and receive control data from the QKD receiver 1. The communicating unit 26 is implemented using the communication I/F 208 illustrated in FIG. 3. Moreover, the communicating unit 26 can either be an interface for wired communication or be an interface for wireless communication.

The controller 20 is a functional unit that controls the overall operations of the key distillation operation units. As illustrated in FIG. 5, the controller 20 includes a central controller 50$b$, a sifting controller 51$b$, an EC controller 52$b$, and a PA controller 53$b$. Moreover, the controller 20 is implemented using the CPU 200 illustrated in FIG. 3.

The central controller 50$b$ is a functional unit that monitors the operation result (the execution log), the operation speed, the operational parameters, the intermediate data, and the key data 63$b$ of the key distillation operation units. Based on the result of monitoring, the central controller 50$b$ instructs the sifting controller 51$b$, the EC controller 52$b$, and the PA controller 53$b$ about the execution timing and the operational parameters of the respective operations or about the changes in the execution timing and the operational parameters of the respective operations. The central controller 50$b$ is implemented using a computer program executed by the CPU 200 illustrated in FIG. 3.

For example, based on the size of the execution log, the intermediate data, and the key data 63$b$ stored in the storage 25; the central controller 50$b$ instructs the sifting controller 51$b$ about the change in the size of the shared bit string and adjusts the size of the memory area in the storage 25 used by the first key-distillation-operation unit 21. Moreover, for example, based on the quantum bit error rate specified in the first intermediate data 61$b$ that represents the execution log of the first key-distillation-operation unit 21 as stored in the storage 25, the central controller 50$b$ instructs the EC controller 52$b$ about the correction in the parameters of the algorithm used in the EC operation performed by the second key-distillation-operation unit 22. That leads to an enhancement in the efficiency of the EC operation. Furthermore, for example, based on the size of the execution log, the intermediate data, and the key data 63$b$ stored in the storage 25; the central controller 50$b$ instructs the PA controller 53$b$ to change the execution timing of the PA operation performed by the third key-distillation-operation unit 23 and reduces the size of the memory area of the storage 25 that is used for storing the second intermediate data 62$b$. As a result, there is an increase in the overall speed for generating the final key data 63$b$ (a cryptographic key).

In this way, the central controller 50$b$ is able to get to know about the operation result (the execution log), the operation speed, the operational parameters, the intermediate data, and the cryptographic key of the key distillation operation units; and accordingly controls the operations of the key distillation operation units in a comprehensive manner. Meanwhile, sometimes the operation speeds of the key distillation operation units are different or sometimes, as the available memory area in the storage 25 approaches the upper limit, there occurs a bottleneck in some of the key distillation operation units and thus the overall operation speed does not increase by a sufficient amount. In such cases, the central controller 50$b$ changes the operational parameters and the execution timing of the key distillation operation units as well as changes the available memory area so as to adjust the balance of the operation speeds of the key distillation operation units. That enables achieving enhancement in the overall quantum key distribution speed.

Meanwhile, in the case of performing data communication using a classical communication channel, the central controller 50$b$ performs data communication by controlling only the communicating unit 26. As a result, it becomes possible to achieve sequencing of the key distillation operation.

Moreover, the central controller 50$a$ monitors the volume of stored data in the storage 25 and monitors the communicating unit 26. As a result, for example, when there is a constraint on the available area in the storage 25, the central controller 50$b$ instructs the sifting controller 51$b$, the EC controller 52$b$, and the PA controller 53$b$ to adjust the size of the intermediate data and the cryptographic key output during the key distillation operation, thereby enabling avoiding the available memory crunch of the storage 25. Moreover, for example, when there is a constraint on the communication band in the communicating unit 26, the central controller 50$b$ instructs the sifting controller 51$b$, the EC controller 52$b$, and the PA controller 53$b$ to switch to an algorithm (operation details) having a smaller volume of data communication during the key distillation operation, thereby enabling avoiding the communication band crunch of the communicating unit 26. On the other hand, when a sufficient communication band is available, the central controller 50$b$ can switch to an algorithm having a large volume of data communication during the key distillation operation.

The sifting controller 51b is a functional unit that functions as a driver for controlling the operations of the first key-distillation-operation device 201. Moreover, the sifting controller 51b makes the first key-distillation-operation unit 21 perform the sifting operation according to instructions and modifications about the operational parameters and the execution timing as issued by the central controller 50b. Furthermore, the sifting controller 51b performs communication control with respect to the communicating unit 26 with the aim of communicating the base information, which is used by the first key-distillation-operation unit 21 in performing the sifting operation, with the QKD receiver 1. Herein, the sifting controller 51b is implemented using a computer program executed by the CPU 200 illustrated in FIG. 3. Meanwhile, although the sifting operation is performed by the first key-distillation-operation unit 21 as described above, some part of the sifting operation can alternatively be performed by the sifting controller 51b. In that case, the first key-distillation-operation unit 21 and the sifting controller 51b, which performs some part of the sifting operation, constitute the "first key-distillation-operation unit".

The EC controller 52b is a functional unit that functions as a driver for controlling the operations of the second key-distillation-operation device 202. Moreover, the EC controller 52b makes the second key-distillation-operation unit 22 perform the EC operation according to instructions and modifications about the operational parameters and the execution timing as issued by the central controller 50b. Furthermore, the EC controller 52b performs communication control with respect to the communicating unit 26 with the aim of communicating the EC information, which is used by the second key-distillation-operation unit 22 in performing the EC operation, with the QKD receiver 1. Herein, the EC controller 52b is implemented using a computer program executed by the CPU 200 illustrated in FIG. 3. Meanwhile, although the EC operation is performed by the second key-distillation-operation unit 22 as described above, some part of the EC operation can alternatively be performed by the EC controller 52b. In that case, the second key-distillation-operation unit 22 and the EC controller 52b, which performs some part of the EC operation, constitute the "second key-distillation-operation unit".

The PA controller 53b is a functional unit that functions as a driver for controlling the operations of the third key-distillation-operation device 203. Moreover, the PA controller 53b makes the third key-distillation-operation unit 23 perform the PA operation according to instructions and modifications about the operational parameters and the execution timing as issued by the central controller 50b. Furthermore, the PA controller 53b performs communication control with respect to the communicating unit 26 with the aim of receiving the PA information, which is used by the third key-distillation-operation unit 23 in performing the PA operation, from the QKD receiver 1. Herein, the PA controller 53b is implemented using a computer program executed by the CPU 200 illustrated in FIG. 3. Meanwhile, although the PA operation is performed by the third key-distillation-operation unit 23 as described above, some part of the PA operation can alternatively be performed by the PA controller 53b. In that case, the third key-distillation-operation unit 23 and the PA controller 53b, which performs some part of the PA operation, constitute the "third key-distillation-operation unit".

Herein, it is assumed that the central controller 50b, the sifting controller 51b, the EC controller 52b, and the PA controller 53b are implemented using computer programs executed by the CPU 200. However, that is not the only possible case. Alternatively, at least some of the functions can be implemented using hardware circuitry.

Moreover, the central controller 50b, the sifting controller 51b, the EC controller 52b, and the PA controller 53b of the controller 20 represent the respective functions in a conceptual manner, and the configuration thereof is not limited to the explanation given above.

Figure 6:
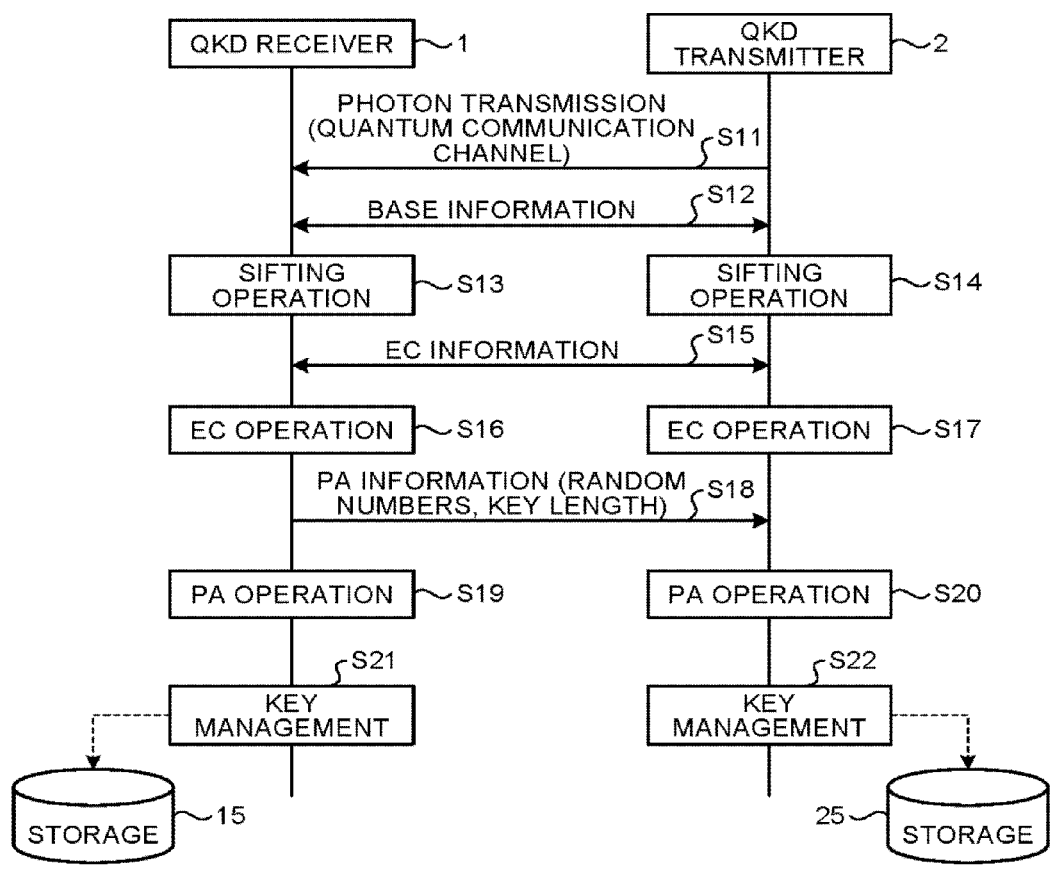
FIG. 6 is a sequence diagram illustrating the operations performed by the QKD receiver and the QKD transmitter.
Figure 7:
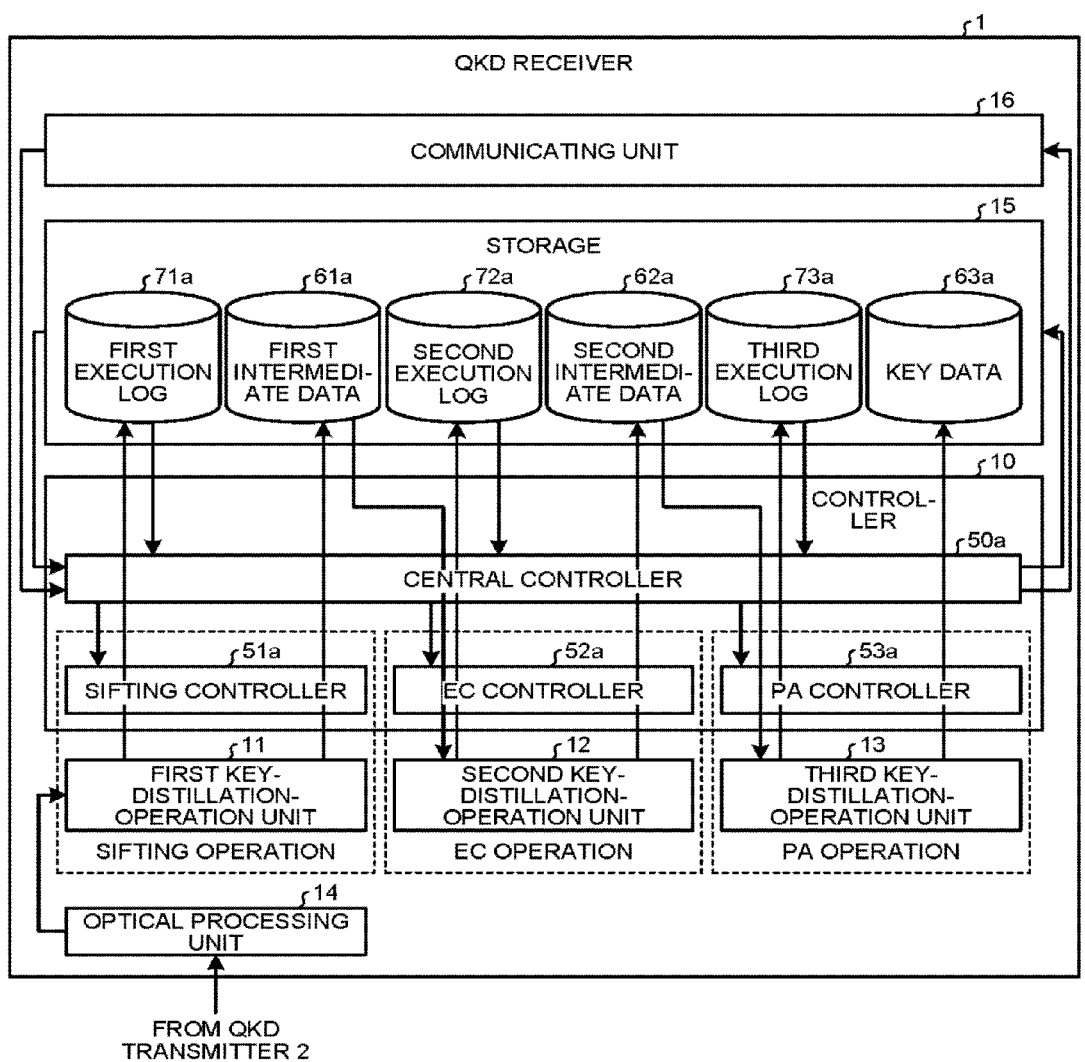
FIG. 7 is a diagram that schematically illustrates the flow of data in the QKD receiver.
Figure 8:
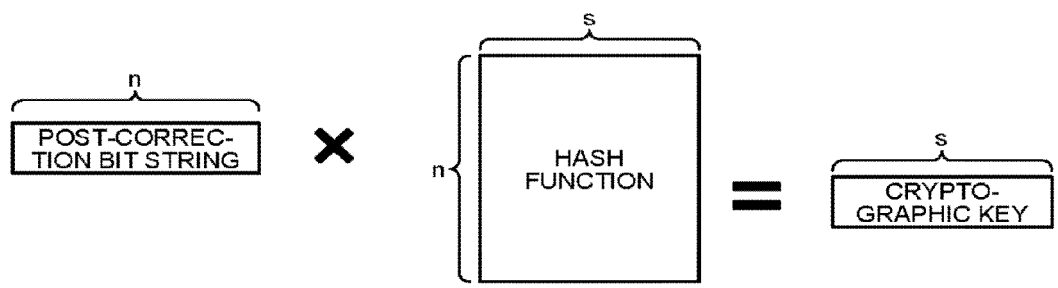
FIG. 8 is a diagram for explaining a privacy amplification operation.

FIG. 6 is a sequence diagram illustrating the operations performed by a QKD receiver and a QKD transmitter. FIG. 7 is a diagram that schematically illustrates the flow of data in a QKD receiver. FIG. 8 is a diagram for explaining the privacy amplification operation. Thus, explained with reference to FIGS. 6 to 8 is a sequence of operations, including the key distillation operation, performed by the QKD receiver 1 and the QKD transmitter 2 to generate a cryptographic key. Herein, although the flow of data in the QKD receiver 1 is schematically illustrated in FIG. 7, the flow of data in the QKD transmitter 2 is also identical.

<Step S11>

In the QKD transmitter 2, for example, the optical processing unit 24 generates a photon string that is made of single photons having a state based on base information generated in a random manner as against a bit string (a photon bit string) generated using random numbers. Then, the optical processing unit 24 sends the generated photon string to the optical processing unit 14 of the QKD receiver 1 via a quantum communication channel. Moreover, the optical processing unit 24 sends the photon bit string and the base information to the first key-distillation-operation unit 21.

In the QKD receiver 1, the optical processing unit 14 receives the photon string from the optical processing unit 24 of the QKD transmitter 2 via a quantum communication channel. Then, the optical processing unit 14 obtains a photon bit string by reading the received photon string based on base information generated in a random manner. Subsequently, the optical processing unit 14 sends the photon bit string and the base information to the first key-distillation-operation unit 11 of the QKD receiver 1.

<Step S12>

The first key-distillation-operation unit 11 receives the base information, which is generated by the optical processing unit 24 in a random manner for the purpose of sending a photon string, via the communicating unit 16 and a classical communication channel. On the other hand, the first key-distillation-operation unit 21 receives the base information, which is generated by the optical processing unit 14 in a random manner for the purpose of reading a photon string, via the communicating unit 26 and a classical communication channel.

<Step S13>

In the QKD receiver 1, the sifting controller 51a makes the first key-distillation-operation unit 11 perform the sifting operation according to instructions and modifications about the operational parameters and the execution timing as issued by the central controller 50a. Then, the first key-distillation-operation unit 11 performs the sifting operation that includes comparing the base information received from the optical processing unit 14 with the base information received from the first key-distillation-operation unit 21; extracting the bits corresponding to the matching portion from the photon bit string; and generating a shared bit string. As illustrated in FIG. 7, the first key-distillation-operation unit 11 stores the shared bit string, which is generated as a result of the sifting operation, as the first intermediate data 61a in the storage 15; and stores log data containing the parameters obtained as a result of the sifting operation as the first execution log 71a in the storage 15.

<Step S14>

In the QKD transmitter 2, the sifting controller 51b makes the first key-distillation-operation unit 21 perform the sifting operation according to instructions and modifications about the operational parameters and the execution timing as issued by the central controller 50b. Then, the first key-distillation-operation unit 21 performs the sifting operation that includes comparing the base information received from the optical processing unit 24 with the base information received from the first key-distillation-operation unit 11; extracting the bits corresponding to the matching portion from the photon bit string; and generating a shared bit string. Moreover, the first key-distillation-operation unit 21 stores the shared bit string, which is generated as a result of the sifting operation, as the first intermediate data 61b in the storage 25; and stores log data containing the parameters obtained as a result of the sifting operation as the first execution log 71b in the storage 25.

<Step S15>

The second key-distillation-operation unit 12 of the QKD receiver 1 and the second key-distillation-operation unit 22 of the QKD transmitter 2 exchange EC information, which is control data for correcting errors in the shared bit string, via a classical communication channel.

<Step S16>

In the QKD receiver 1, the EC controller 52a makes the second key-distillation-operation unit 12 perform the EC operation according to instructions and modifications about the operational parameters and the execution timing as issued by the central controller 50a. Then, the second key-distillation-operation unit 12 reads the shared bit string represented by the first intermediate data 61a that is stored in the storage 15. Subsequently, based on the EC information that is exchanged with the second key-distillation-operation unit 22 via a classical communication channel, the second key-distillation-operation unit 12 performs an EC operation for correcting the bit errors in the shared bit string and generating a post-correction bit string. As illustrated in FIG. 7, the second key-distillation-operation unit 12 stores the post-correction bit string, which is generated as a result of the EC operation, as the second intermediate data 62a in the storage 15; and stores log data containing the parameters obtained during the EC operation as the second execution log 72a in the storage 15. Herein, the post-correction bit string generated by the second key-distillation-operation unit 12 matches with the post-correction bit string that is generated by the second key-distillation-operation unit 22 of the QKD transmitter 2 by performing correction with respect to the shared bit string.

<Step S17>

In the QKD transmitter 2, the EC controller 52b makes the second key-distillation-operation unit 22 perform the EC operation according to instructions and modifications about the operational parameters and the execution timing as issued by the central controller 50b. Then, the second key-distillation-operation unit 22 reads the shared bit string represented by the first intermediate data 61b that is stored in the storage 25. Subsequently, based on the EC information that is exchanged with the second key-distillation-operation unit 12 via a classical communication channel, the second key-distillation-operation unit 22 performs an EC operation for correcting the bit errors in the shared bit string and generating a post-correction bit string. Then, the second key-distillation-operation unit 22 stores the post-correction bit string, which is generated as a result of the EC operation, as the second intermediate data 62b in the storage 25; and stores log data containing the parameters obtained during the EC operation as the second execution log 72b in the storage 25. Herein, the post-correction bit string generated by the second key-distillation-operation unit 22 matches with the post-correction bit string that is generated by the second key-distillation-operation unit 12 by performing correction with respect to the shared bit string.

<Step S18>

In the QKD receiver 1, the third key-distillation-operation unit 13 sends PA information (information about the random numbers and the length of the cryptographic key) to the third key-distillation-operation unit 23 of the QKD transmitter 2 via a classical communication channel. Thus, the third key-distillation-operation unit 23 obtains the PA information from the third key-distillation-operation unit 13 via a classical communication channel.

<Step S19>

In the QKD receiver 1, the PA controller 53a makes the third key-distillation-operation unit 13 perform the PA operation according to instructions and modifications about the operational parameters and the execution timing as issued by the central controller 50a. Then, the third key-distillation-operation unit 13 reads the shared bit string represented by the second intermediate data 62a that is stored in the storage 15. Subsequently, based on the PA information sent to the third key-distillation-operation unit 23 via a classical communication channel, the third key-distillation-operation unit 13 performs a PA operation for removing such bits from the number of errors corrected by the second key-distillation-operation unit 12 which are likely to have been tapped by a wiretapper during the sifting operation and the EC operation, and generating a key bit string (a cryptographic key).

More particularly, as illustrated in FIG. 8, the third key-distillation-operation unit 13 performs the PA operation for generating a hash function that is in the form of an n×s matrix from a length n of the post-correction bit string generated by the second key-distillation-operation unit 12 and read from the storage 15, a random number r specified in the PA information, and a length s of cryptographic keys; and that is randomly configured using the random number r. Then, the third key-distillation-operation unit 13 multiplies the hash function to the post-correction bit string, and generates a cryptographic key (a key bit string) having the length s. Meanwhile, the PA operation is not limited to the method using a hash function, and any other method can alternatively be implemented.

<Step S20>

In the QKD transmitter 2, the PA controller 53b makes the third key-distillation-operation unit 23 perform the PA operation according to instructions and modifications about the operational parameters and the execution timing as issued by the central controller 50b. Then, the third key-distillation-operation unit 23 reads the shared bit string represented by the second intermediate data 62b that is stored in the storage 25. Subsequently, based on the PA information received from the third key-distillation-operation unit 13 via a classical communication channel, the third key-distillation-operation unit 23 performs a PA operation for removing such bits from the number of errors corrected by the second key-distillation-operation unit 22 which are likely to have been tapped by a wiretapper during the sifting operation and the EC operation, and generating a key bit string (a cryptographic key). Herein, the specific method of the PA operation performed by the third key-distillationoperation unit 23 is identical to the method of the PA operation performed by the third key-distillation-operation unit 13.

<Step S21>

As illustrated in FIG. 7, the third key-distillation-operation unit 13 stores the cryptographic key, which is generated as a result of the PA operation, as the key data 63a in the storage 15 as well as manages the cryptographic key; and stores log data containing the parameters obtained as a result of performing the PA operation as the third execution log 73a in the storage 15. The cryptographic key stored (managed) in the storage 15 is provided to an external application as may be necessary.

<Step S22>

The third key-distillation-operation unit 23 stores the cryptographic key, which is generated as a result of the PA operation, as the key data 63b in the storage 25 as well as manages the cryptographic key; and stores log data containing the parameters obtained as a result of performing the PA operation as the third execution log 73b in the storage 25. The cryptographic key stored (managed) in the storage 25 is provided to an external application as may be necessary.

As a result of performing the operations described above, identical cryptographic keys are generated in the QKD receiver 1 and the QKD transmitter 2. Meanwhile, the steps described above can be performed in parallel. For example, in parallel with the EC operation performed at Steps S16 and S17, the sifting operation at Steps S13 and S14 can be performed with respect to a different bit string. Moreover, the cryptographic key generated as a result of performing the operations described above represents what is called one time pad. Hence, every time the operations are performed, a different key is generated.

As described above, in the QKD receiver 1 according to the embodiment, the first key-distillation-operation device 101 (the first key-distillation-operation unit 11), the second key-distillation-operation device 102 (the second key-distillation-operation unit 12), and the third key-distillation-operation device 103 (the third key-distillation-operation unit 13) transfer intermediate data via the storage 15. More particularly, the first key-distillation-operation device 101 stores the shared bit string, which is generated as a result of the sifting operation, in the storage 15 without sending it to the second key-distillation-operation device 102. Then, the second key-distillation-operation device 102 reads the shared bit string from the storage 15; and stores the post-correction bit string, which is generated as a result of the EC operation, in the storage 15 without sending it to the third key-distillation-operation device 103. Moreover, the third key-distillation-operation device 103 reads the post-correction bit string from the storage 15 and stores the cryptographic key, which is generated as a result of the PA operation, in the storage 15 without directly providing it to an external application. Thus, even if the operation speeds of the key distillation operation units are different or even if some of the key distillation operation units are stopped or are malfunctioning, the other key distillation operation units can continue with the key distillation operation as long as the intermediate data required during the key distillation operation is stored in the storage 15. Hence, if some of the key distillation operation units are malfunctioning, the malfunctioning key distillation operation units that are detachably attachable in nature can be replaced even while the other key distillation operation units are performing operations. In an identical manner, since the key distillation operation units are highly independent in nature, they can be interchanged with ease depending on the requirement (such as the operation speed requirement) of the delivery destination of the system, thereby enabling the most suitable configuration of the quantum key distribution system 500.

In the first place, since the intermediate data and the cryptographic key generated by the key distillation operation units have different block sizes, it becomes essential to buffer the intermediate data and the cryptographic key in the storage 15. For example, in the PA operation, if the block size is constantly kept large, then the size of the generated cryptographic key can be increased. On the other hand, in the EC operation, there is no difference in the algorithm related to the block size. Hence, the block size can be determined to simply ensure that the operation speed is the highest. Moreover, depending on the operational parameters (such as the quantum bit error rate) of the key distillation operation, there are times when reference data (encoding data) that should be used in the EC operation undergoes changes or when a different parameter for determining the size of the cryptographic key in the PA operation undergoes changes during the operations of the system. That may cause variation in the memory area required to buffer the intermediate data and the cryptographic key, which are generated by the key distillation operation devices, in the storage 15. Therefore, it is difficult to design in advance the memory area of the storage 15 as required by the key distillation operation units. For that reason, there is an advantage in having a configuration in which all intermediate data and the cryptographic key is buffered in the storage 15 serving as the common storage device, and the available memory area to each operation constituting the key distillation operation device can be varied even during the operations of the system. From that perspective, when the key distillation operation devices buffer the intermediate data and the cryptographic key in the storage 15 serving as the common storage device, it enhances the system availability. Meanwhile, the details given above are applicable to not only to the QKD receiver 1 but also to the QKD transmitter 2.

In the QKD receiver 1 and the QKD transmitter 2, each operation constituting the key distillation operation (i.e., the sifting operation, the EC operation, and the PA operation) is performed in a different key distillation operation device that is a hardware device. Hence, even if the sifting operation, the EC operation, and the PA operation require different hardware properties for high-speed processing, it is possible to use dedicated hardware devices of different types. Thus, for each operation constituting the key distillation operation, a hardware device that enables achieving high speed can be selected and used individually. For example, depending on the algorithm implemented therein, the EC operation and the PA operation may have different requirements (such as the operational parallelism and the required types of hardware computing units) regarding the hardware. In this way, as a result of performing each operation constituting the key distillation operation in a different key distillation operation device that is a hardware device, the most suitable hardware device for each operation can be selected and used. Hence, in the entire quantum key distribution system 500, it becomes possible to perform high-speed key distillation operation (quantum key distribution).

Meanwhile, in the embodiment, the controllers (the controls units 10 and 20) monitor the intermediate data and the cryptographic keys stored in the storage (the storages 15 and 25). With that, the controllers can directly and individually monitor the input and output with respect to each high-speed key distillation operation device, thereby enabling achieving an enhanced level of maintenance. Moreover, since the controllers (the CPUs 100 and 200) can directly access the key distillation devices via the buses (the buses 110 and 210); it becomes easier to directly monitor, upgrade, debug, and adjust the operations of the key distillation operation devices. For example, it becomes easier to correct the setting files of the high-speed key distillation operation devices in the storages (the storages 15 and 25), and to directly access the registers of the key distillation operation devices.

Moreover, in the embodiment, as a result of storing the intermediate data and the cryptographic keys in the common storages (the storages 15 and 25), data consistency can be maintained.

Meanwhile, in the QKD receiver 1 or the QKD transmitter 2, each operation constituting the key distillation operation device need not be configured using a hardware device. For example, in the quantum key distribution system 500, there are three QKD transmitters 2 but only a single QKD receiver 1. Thus, the load of key distillation operation in the QKD receiver 1 becomes greater as compared to the load in the QKD transmitters 2. Hence, in such a configuration of the quantum key distribution system 500, the QKD receiver 1 can include all key distillation operation devices that are hardware devices, so that the key distillation operation can be performed at a high speed.

Meanwhile, while storing the generated intermediate data or the generated cryptographic key in the storage, the key distillation operation units either can store the data via a controller such as the CPU or can directly store the data in the storage according to the direct memory access (DMA) method.

The computer programs executed in the QKD devices according to the embodiment are stored in advance in the ROMs (the ROMs 105 and 205).

Alternatively, the computer programs executed in the QKD devices according to the embodiment can be recorded as installable or executable files in a computer-readable recording medium such as a compact disk read only memory (CD-ROM), a flexible disk (FD), a compact disk recordable (CD-R), or a digital versatile disk (DVD); and can be provided as a computer program product.

Still alternatively, the computer programs executed in the QKD devices according to the embodiment can be saved as downloadable files on a computer connected to the Internet or can be made available for distribution through a network such as the Internet.

The computer programs executed in the QKD devices according to the embodiment can make a computer function as the constituent elements of the QKD devices (i.e., as the central controllers 50a and 50b, the sifting controllers 51a and 51b, the EC controllers 52a and 52b, and the PA controllers 53a and 53b). In such a computer, the CPU 100 or the CPU 200 can read the computer programs from a computer-readable memory medium, load them in a main storage device, and execute them.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum key distribution device performing a key distillation operation comprising:
a first operation unit configured to perform a first operation, the first operation unit including a hardware circuit other than a storage for performing at least a part of the first operation, the key distillation operation including a sifting operation performed with respect to a photon bit string that is generated through quantum key distribution with another quantum key distribution device via a quantum communication channel, and the first operation representing at least a part of the key distillation operation after the sifting operation;
a second operation unit configured to perform a second operation that represents the key distillation operation after the sifting operation other than the first operation, the second operation unit including a hardware circuit other than a storage for performing at least a part of the second operation, the hardware circuit included in the second operation unit being a component different from the hardware circuit included in the first operation unit; and
a storage that is a component different from the first operation unit and the second operation unit, wherein
the first operation unit stores intermediate data generated by the first operation in the storage,
the second operation unit generates, by the second operation, a cryptographic key from the intermediate data stored in the storage, the cryptographic key being the same as that generated by the another quantum key distribution device,
when the first operation unit is stopped or malfunctioning:
the second operation unit continues the second operation, and
the first operation unit is replaceable when the second operation is being performed by the second operation unit; and
when the second operation unit is stopped or malfunctioning:
the first operation unit continues the first operation, and
the second operation unit is replaceable when the first operation is being performed by the first operation unit.

2. The quantum key distribution device according to claim 1, wherein the first operation unit and the second operation unit as a whole include
a first key-distillation-operation unit configured to generate a shared bit string from the photon bit string by the sifting operation and store the shared bit string in the storage,
a second key-distribution-operation unit configured to correct an error in the shared bit string stored in the storage by an error correction operation to generate a post-correction bit string, and store the post-correction bit string in the storage, and
a third key-distribution-operation unit configured to perform a privacy amplification operation on the post-correction bit string stored in the storage to generate the cryptographic key.

3. The quantum key distribution device according to claim 1, further comprising a controller configured to control operation of the first operation unit and operation of the second operation unit, wherein
each of the first operation unit and the second operation unit stores an execution log that includes a result of the key distillation operation in the storage, and
based on at least one the execution log, operation speed of the first operation unit and the second operation unit, and the intermediate data, the controller changes at least one of an operational parameter of the first operation unit and the second operation unit, execution timing of the key distillation operation, and available memory area of the storage, to adjust operation speed of the first operation unit and the second operation unit.

4. The quantum key distribution device according to claim 3, wherein the controller monitors volume of stored data in the storage to adjust at least one of size of the intermediate data generated by the first operation unit and size of the cryptographic key generated by the second operation unit.

5. The quantum key distribution device according to claim 3, further comprising a communicating unit configured to communicate, with the another quantum key distribution device, control data that is required when the first operation unit performs the first operation and the second operation unit performs the second operation, wherein
the controller controls communication of the control data performed by the communicating unit.

6. The quantum key distribution device according to claim 5, wherein the controller monitors communication band of the communicating unit, and changes operation details of the first operation and the second operation according to the communication band to adjust communication volume of the control data.

7. A quantum key distribution system comprising a plurality of quantum key distribution devices each corresponding to the quantum key distribution device according to claim 1, wherein
the plurality of quantum key distribution devices are connected through the quantum communication channel, and perform the quantum key distribution via the quantum communication channel and perform the key distillation operation to generate the cryptographic key that is the same as that generated by each of the plurality of quantum key distribution devices.

8. A quantum key distribution method for a quantum key distribution device performing a key distillation operation the method comprising:
performing a first operation by a first operation unit, and performing at least a part of the first operation by an integrated circuit that is included in the first operation unit and that is other than a storage, the key distillation operation including a sifting operation performed with respect to a photon bit string that is generated through quantum key distribution with another quantum key distribution device via a quantum communication channel, and the first operation representing at least a part of the key distillation operation after the sifting operation;
performing by a second operation unit a second operation that represents the key distillation operation after the sifting operation other than the first operation, and performing at least a part of the second operation by an integrated circuit that is included in the second operation unit and that is other than a storage, the integrated circuit for performing at least a part of the second operation being a component different from the integrated circuit for performing at least a part of the first operation;
storing intermediate data generated by the first operation in a storage that is a component different from the integrated circuit for performing at least a part of the first operation and the integrated circuit for performing at least a part of the second operation; and
generating, by the second operation, a cryptographic key from the intermediate data stored in the storage, the cryptographic key being the same as that generated by the another quantum key distribution device, wherein
when the first operation unit is stopped or malfunctioning:
the second operation by the second operation unit continues, and
the first operation unit is replaceable when the second operation is being performed by the second operation unit; and
when the second operation unit is stopped or malfunctioning:
the first operation by the first operation unit continues, and
the second operation unit is replaceable when the first operation is being performed by the first operation unit.

* * * * *